(Model.)
F. C. SCHROEDER.
COLOR CHART OR SCALE.
No. 377,086.      Patented Jan. 31, 1888.
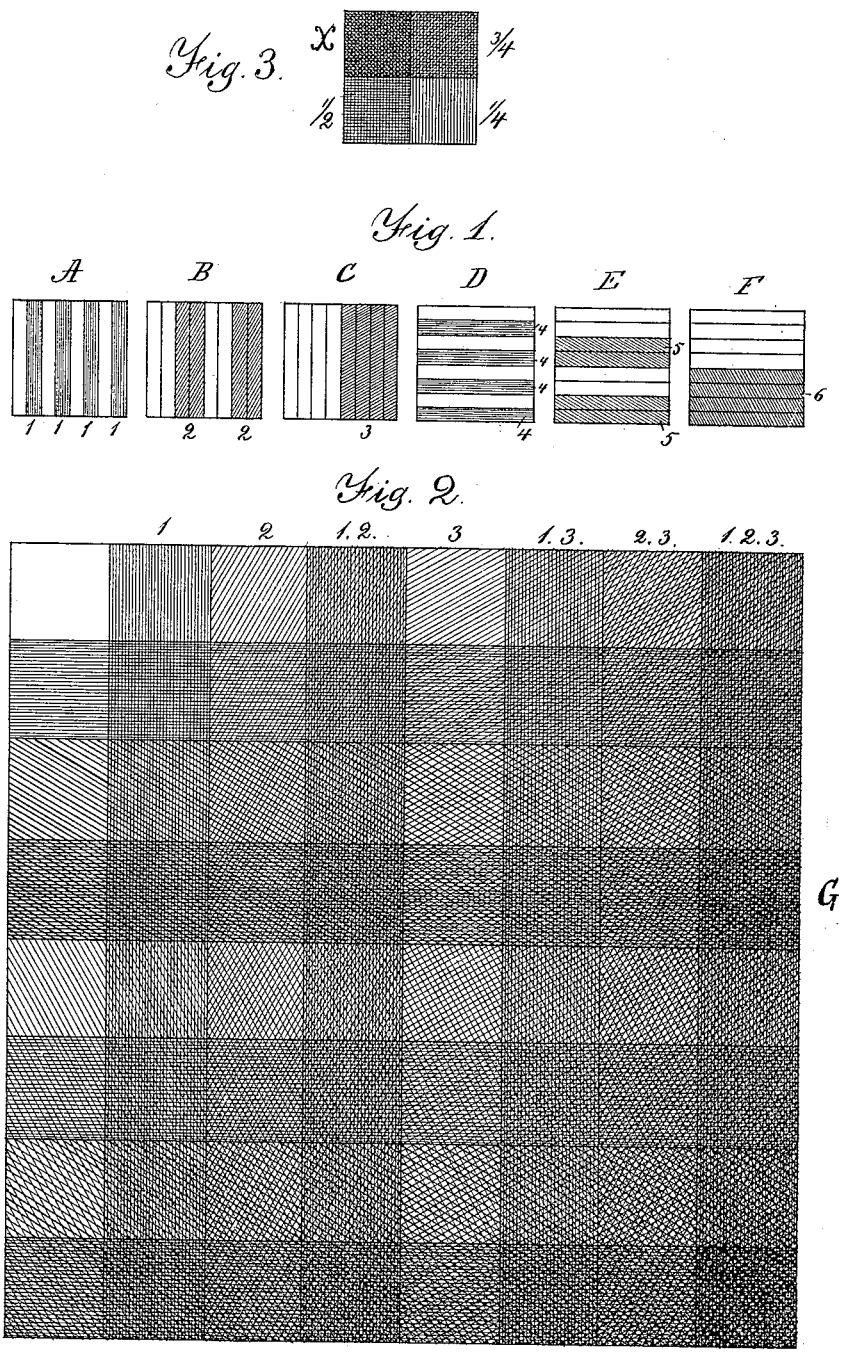

UNITED STATES PATENT OFFICE.

FREDERICK C. SCHROEDER, OF BOSTON, MASSACHUSETTS.

COLOR CHART OR SCALE.

SPECIFICATION forming part of Letters Patent No. 377,086, dated January 31, 1888.

Application filed July 13, 1887. Serial No. 244,158. (Model.)

*To all whom it may concern:*

Be it known that I, FREDERICK C. SCHROEDER, a citizen of the United States, and a resident of Boston, in the county of Suffolk and State of Massachusetts, have invented new and useful Improvements in Color Charts or Scales, of which the following, taken in connection with the accompanying drawings, is a specification.

This invention relates to an improved color chart or scale for the purpose of indicating at a glance what color is produced by the combination of any chosen number of colors, or, which is the same, what combination of colors will produce any given color in the chart or scale; and for this purpose I use a series of figures, which I term the "keys," which I divide into vertical and horizontal fields, the number of such keys being equal to the number of colors combined upon the chart or scale. One-half, or more or less, of the keys are divided into vertical fields, and the other half, or more or less, of said keys are divided into horizontal fields. In connection with said keys I use a chart or scale divided vertically and horizontally into squares or spaces to which the colors of the keys are applied in such a manner as to produce all the possible combinations of colors that can be produced by the number of colors in the keys, as will hereinafter be more fully shown and described, reference being had to the accompanying drawings, wherein—

Figure 1 represents the keys, each one of which contains a color desired to be combined with the other colors in the remaining keys for the purpose stated. Fig. 2 represents the scale or chart divided into squares or spaces, each one of which contains either one of the single colors of the respective keys, or one of the combinations of such colors, with one square or space left blank; and Fig. 3 represents the color or combination and three diminished shades thereof into which the colors may be divided in each of the squares or spaces on the chart.

Similar letters refer to similar parts wherever they occur on the different parts of the drawings.

The object of this invention is to instruct beginners in painting, water-color students, lithographers, and others what colors to mix so as to produce any required color or effect, or to indicate at a glance of what individual colors any given color or effect is composed, thus saving valuable time used in experiments for obtaining such knowledge.

To illustrate my invention I have shown in Fig. 1 six keys, A, B, C, D, E, and F, each one of which contains a color differing from the others in the remaining keys. The keys A, B, and C are divided each into eight vertical fields or stripes, and the keys D, E, and F are divided each into eight horizontal fields or stripes, as shown. The color in key A is applied to every other of its vertical fields, as shown at 1 1 1 1 in said key A. The color in key B is applied to every other two of its vertical fields, as shown at 2 2 in said key B. The color in key C is applied to every other four of its vertical fields, as shown at 3 in said key C. The color in key D is applied to every other of its horizontal fields, as shown at 4 4 4 4 in said key D. The color in key E is applied to every other two of its horizontal fields, as shown at 5 5 in said key E, and the color in key F is applied to every other four of its horizontal fields, as shown at 6 in said key F.

G in Fig. 2 represents the scale or chart to which the colors in the keys A, B, C, D, E, and F are applied in such a manner as to produce all the possible combinations of colors that can be obtained by the colors in the said keys. The said chart or scale is divided vertically and horizontally so as to form a given number of squares or spaces equal to the sum of the number of colors in the said keys A B C D E F, the combinations of said colors, and one blank—thus six single colors, fifty-seven combinations, and one blank—making in all sixty-four squares or spaces in the said chart or scale G. On the said chart or scale G, I apply on every other one of its vertical fields or divisions the color of key A, according as it is shown in said key and as shown by the numbers 1 1 1 1 at the top of said scale or chart. To every other two of the vertical fields of the chart I apply the color of key B, according as it is shown in said key and as shown by the numbers 2 2 2 2 at the top of said scale or chart, and to every other four of the vertical fields of the chart I apply the color of key C, according as it is shown in said key and as shown by the numbers 3 3 3 3 at the top of said scale or chart. Having thus disposed of the colors in keys A B C on the vertical divisions of the chart or scale, I apply in a similar manner the colors of the keys D, E, and F, respectively, on every other, every other two, and every other four of the horizontal divisions of the chart or scale, as indicated at the side of said chart, respectively, by numbers 4 4 4 4, 5 5 5 5, and 6 6 6 6. In this manner I produce a chart or scale upon which can be found not alone the single colors of each of the keys A, B, C, D, E, and F, but also all the combinations that can be produced by the said key-colors, and if it is desired to ascertain of what key color or colors any one of the squares or spaces in the chart or scale is composed it is only necessary to note the numeral or numerals of the vertical and horizontal divisions intersecting at such space of the chart. Thus, for instance, the square or space at the intersection of the fourth vertical space from the left and the sixth horizontal space from the top will indicate that the color is produced by the combination of the colors 1 2 and 4 6 in the keys A B D F. The lower right-hand square or space on the chart will also indicate that it is composed of all the colors 1 2 3 4 5 6 in the keys A, B, C, D, E, and F, and so on. These numerals I term the "index."

The keys serve to indicate, first, what single colors are used in constructing the chart, and, secondly, serve to indicate in what manner such key-colors are applied to the chart; and it is obvious that instead of numerals I may employ letters or other characters for identifying the key-colors and their combinations.

If so desired, each square or space in the chart or scale may be subdivided into four or more squares or spaces, as shown in Fig. 3, in this case indicating one-fourth, one-half, three-fourths, and solid, as shown at ¼, ½, ¾, and x in said Fig. 3.

I wish to state that I do not desire to confine myself to any number of colors or keys to be used in connection with the chart, as the number of keys will depend entirely on the odd or even number of chosen colors, as may be desired. Neither do I wish to confine myself to a chart made in the form of a square and divided equally into vertical and horizontal squares or fields, as this may be varied according to circumstances. Thus, for instance, where two colors only are to be used in the chart, I use two keys, one of which is divided vertically into two fields and the other horizontally also into two fields, combined with a square chart divided into four squares applied alternately in every vertical and horizontal field.

If I desire a chart or scale of combinations of three colors, I use three keys, two of which are divided into vertical fields and the other one into horizontal fields, or vice versa, the two first ones being divided into four fields, and having the two first colors applied respectively to every other field and every other two of its fields, respectively, and the third key divided into two horizontal fields, and having its color applied to one of its fields, or vice versa, combined with a chart or scale made in the form of a parallelogram with four vertical divisions and two horizontal divisions, or vice versa. For four colors I use four keys, two of which are divided into four vertical fields, and two keys divided into four horizontal fields, combined with a scale or chart divided into corresponding vertical and horizontal fields, to which the key-colors are applied to every other vertical and horizontal field and every other two of its vertical and horizontal fields, respectively. For five colors I use five keys, three of which are divided into vertical fields and two into horizontal fields, or vice versa, combined with a chart made in the form of a parallelogram and divided into eight vertical fields and four horizontal ones, or vice versa, to which the key-colors are applied to every other vertical field, every other two of its vertical fields, and every other four of its said vertical fields, every other of its horizontal fields, and every other two of its horizontal fields, or vice versa. Thus the chart for an odd number of colors and keys will be made in the form of a parallelogram divided into corresponding vertical and horizontal fields, and the chart for an even number of colors may be made, as desired, either in the form of a square or parallelogram with vertical and horizontal fields. It will be noted, however, that the rule or system for the chart is uniform in this respect; that, no matter how many colors are used, the chart is made either a square or a parallelogram, with squares or spaces equal to the combined number of the key-colors, all the possible combinations of said colors, and one blank space. Thus, for instance, when an even number of key-colors—for instance, six—are used, sixty-four squares or spaces are arranged in the chart, and this may be obtained by a square chart divided into eight vertical and eight horizontal fields, or four by sixteen, or two by thirty-two, if so desired, without departing from the essence of my invention; but in practice I prefer to make the chart or scale in the form of a square where an even number of key-colors are used.

In using my invention I paint, print, or apply on the chart the primary colors of the keys in the manner and serial rotation as indicated by said keys, allowing one color to dry before another is applied, and said colors, being transparent, will, when laid over each other on the chart, produce the same effect as if the said colors had been originally mixed together and such mixture applied to the desired square or space.

Having thus fully described the nature of my invention, I wish to secure by Letters Patent, and claim—

The herein-described color-chart, comprising a series of color-keys, as A B C D E F, equal in number to the colors to be combined, said keys being divided vertically and horizontally into fields, as described, a scale, as G, divided vertically and horizontally into colored squares or spaces equal to the number of key-colors, all the combinations of said key-colors, and a blank, and index characters for identifying the key-colors and their combinations, substantially as specified.

In testimony whereof I have signed my name to this specification, in the presence of two subscribing witnesses, on this 12th day of July, A. D. 1887.

FREDERICK C. SCHROEDER.

Witnesses:
ALBAN ANDRÉN,
EDGAR O. ACHESON.